US010558897B2

(12) United States Patent
Sharma et al.

(10) Patent No.: US 10,558,897 B2
(45) Date of Patent: Feb. 11, 2020

(54) CONTEXT-BASED DIGITAL SIGNAL PROCESSING

(71) Applicant: Intel Corporation, Santa Clara, CA (US)

(72) Inventors: Vinod Sharma, Menlo Park, CA (US); Monica Lucia Martinez-Canales, Los Altos, CA (US); Peggy Jo Irelan, Chandler, AZ (US); Malini Krishnan Bhandaru, San Jose, CA (US); Rita Chattopadhyay, Chandler, AZ (US); Soila Pertet Kavulya, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 22 days.

(21) Appl. No.: 15/855,763

(22) Filed: Dec. 27, 2017

(65) Prior Publication Data
US 2019/0050692 A1 Feb. 14, 2019

(51) Int. Cl.
G06K 9/00 (2006.01)
G06K 9/62 (2006.01)
G06K 9/20 (2006.01)
G06K 9/66 (2006.01)

(52) U.S. Cl.
CPC ....... G06K 9/6292 (2013.01); G06K 9/00805 (2013.01); G06K 9/00825 (2013.01); G06K 9/00845 (2013.01); G06K 9/209 (2013.01); G06K 9/66 (2013.01)

(58) Field of Classification Search
CPC .................................................. G06K 9/6292
See application file for complete search history.

(56) References Cited

U.S. PATENT DOCUMENTS

| 2011/0169625 | A1* | 7/2011 | James | B60Q 9/008 340/439 |
| 2018/0089538 | A1* | 3/2018 | Graham | G05D 1/021 |
| 2018/0141544 | A1* | 5/2018 | Xiao | G01S 13/862 |
| 2018/0150701 | A1* | 5/2018 | Kang | G06K 9/4623 |
| 2019/0057263 | A1* | 2/2019 | Miville | G01S 17/936 |
| 2019/0080167 | A1* | 3/2019 | Zhu | G06K 9/00624 |

* cited by examiner

Primary Examiner — Oneal R Mistry
(74) Attorney, Agent, or Firm — Schwegman Lundberg & Woessner, P.A.

(57) ABSTRACT

Various systems and methods for implementing context-based digital signal processing are described herein. An object detection system includes a processor to: access sensor data from a first sensor and a second sensor integrated in a vehicle; access an operating context of the vehicle; assign a first weight to a first object detection result from sensor data of the first sensor, the first weight adjusted based on the operating context; assign a second weight to a second object detection result from sensor data of the second sensor, the second weight adjusted based on the operating context; and perform a combined object detection technique by combining the first object detection result weighted by the first weight and the second object detection result weighted by the second weight.

23 Claims, 6 Drawing Sheets

| SENSOR | CONTEXT | | | | | | | | | |
|---|---|---|---|---|---|---|---|---|---|---|
| | DAY | NIGHT | NEAR RANGE + LOW ELEVATION | FAR RANGE | LOUD NOISES | TUNNEL | ROAD CONDITION | RAIN / FOG / SNOW | FIRE | GLARE OR SHADOWS |
| LIDAR | | H | H | | | H | H | | | |
| CAMERA | H | | | H | | | | | H | H |
| RADAR | | | | H | | | | H | H | H |
| ACOUSTIC | | | | | H | | | H | | |

FIG. 3

CONTEXT-BASED DIGITAL SIGNAL PROCESSING

TECHNICAL FIELD

Embodiments described herein generally relate to object detection systems, and in particular, to context-based digital signal processing.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

ADAS relies on various sensors that are able to detect objects. Examples of such sensors include visible light cameras, radar, laser scanners (e.g., LiDAR), acoustic (e.g., sonar), and the like. Some vehicles include multiple types of sensors for greater flexibility. As vehicles become more autonomous, implementing sensors accurately is critical to ensuring safe operation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 is a chart illustrating relative weights of sensors under varying contexts, according to an embodiment;

DETAILED DESCRIPTION

Figure 1:
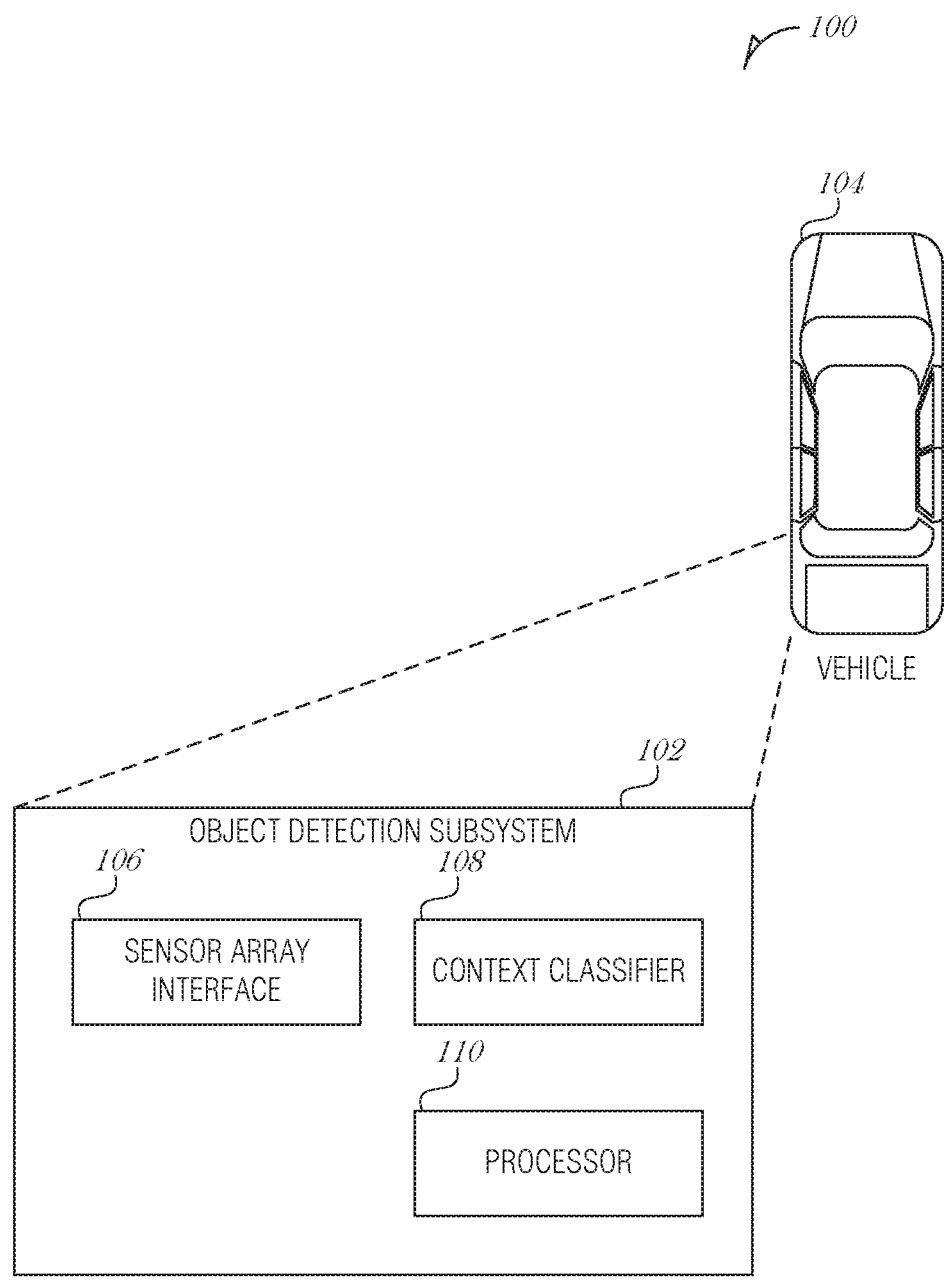
FIG. 1 is a schematic drawing illustrating a system to process contextual information to improve object detection, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Autonomous vehicles (AVs) typically include various forward, sideward, and rearward facing sensors in a vehicle. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

AVs may be partially or fully autonomous and may operate in a partial or full autonomous mode for some or all of the time. Partial autonomous mode may provide various collision avoidance, driver alert systems, lane change warnings, and the like. In contrast, full autonomous mode may relieve the driver from nearly all operational aspects. Modes may be changed during a driving session. For instance, a driver may operate an AV in partial autonomous mode while in the city, and then initiate full autonomous operation after reaching a stretch of highway.

Autonomous driving relies on signals from a diverse set of sensors including cameras, LiDARs, radars, global positioning systems (GPS), and inertial measurement unit (IMU) to perform two primary tasks: simultaneous localization and mapping (SLAM), which generates a map of the environment while simultaneously localizing the vehicle within the map; and detection and tracking of moving objects (DATMO) surrounding the vehicle and the prediction of their future behavior.

Initially, SLAM and DATMO were treated as distinct approaches. Correspondingly, sensors were grouped based on whether they supported SLAM or DATMO. While GPS and IMU units helped determine the location of the vehicle on the road with precision, cameras, LiDAR, and radar were used to detect objects on or near the road, such as other vehicles, pedestrians, debris, and in some cases road features like signs and lane markings. Recent work indicates that combining SLAM with DATMO produces better results for all tasks. Nevertheless, several challenges remain in combining the outputs of multiple sensors to create an environment model in which static and dynamic objects may be tracked accurately and precisely.

Mechanisms described here introduce a method for object detection using a weighted combination of camera, LiDAR, and radar data based on context. The use of "contextual data" including distance (from host vehicle), time of the day, terrain, weather, and other environmental conditions to selectively weight sensor data improves object detection and tracking. The term "host vehicle" refers to the vehicle with the sensors or the vehicle for which the object detection is being performed.

Existing approaches combine the output of camera and LiDAR using a single object detection classifier trained on features extracted from both camera and LiDAR imagery, or use two distinct object detection classifiers with one for each sensor type and select a classification based on confidence level between the distinct classifiers. Both approaches use a static pattern that disregards the context in which the sensors were operating at the time of the classification.

Context, as used in this document, refers to the environmental illumination (e.g., ambient light), elevation of the object in the host vehicle's sensors field of view, weather, time of day, distance from host vehicle, sensor health, emergent situations around the host vehicle, or the like.

The improved sensor system described here realizes that in conditions of low ambient light, such as at night or when under shadows, LiDAR signals provide more information about the objects around the host vehicle than video signals captured by visible light cameras. In contrast, with conditions of bright light, features extracted from cameras (e.g., color, texture, edges), are richer in information than features extracted from LiDAR signals.

The improved sensor system described here also realizes that differences in field of view affect the accuracy of object detection. Cameras do not capture low lying objects close to the host vehicle as well as LiDAR sensors.

Thus the context in which the vehicle operates is an under-acknowledged factor in assessing the relative contribution of each sensor. Merely adding the features extracted from multiple sensors or relying on a fixed confidence level to select one sensor ignores the fact that sensors behave differently under different conditions. As a result, previous approaches to sensor fusion from camera and LiDAR have significant limitations.

In various embodiments, which will be described further below, the host vehicle may be equipped with sensors to detect objects around the host vehicle. Using context-based sensor fusion, sensor signals are selectively and dynamically weighted with reference to the context in which the sensors are operating. This mechanism produces more accurate results for object detection and tracking by an autonomous vehicle. Additional embodiments are described below with reference to the FIGS.

FIG. 1 is a schematic drawing illustrating a system 100 to process contextual information to improve object detection, according to an embodiment. FIG. 1 includes an object detection subsystem 102 incorporated into the vehicle 104. The object detection subsystem 102 includes a sensor array interface 106, a context classifier circuit 108, and a processor 110.

The vehicle 104 may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes a sensor array, which may include various forward, side, and rearward facing cameras, radar, LiDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view.

The vehicle 104 includes an on-board diagnostics system to record vehicle operation and other aspects of the vehicle's performance, maintenance, or status. The on-board diagnostics system may be programmed, configured, or otherwise adapted to monitor sensor health of one or more sensors in the sensor array.

The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the vehicle controller subsystem 102 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 104 obtains sensor data via the sensor array interface 106 from sensors integrated in the vehicle 104, or sensors that are communicatively coupled to the vehicle 104. The sensors may include radar, LiDAR, visible light cameras, acoustic sensors, environmental sensors, infrared sensors, or combinations. Radar is useful in nearly all weather and longer range detection, LiDAR is useful for shorter range detection, cameras are useful for longer ranges but often become less effective in certain weather conditions, such as snow. Combinations of sensors may be used to provide the widest flexibility in varying operating conditions.

Based on the sensor data, the context classifier circuit 108 is able to determine various environmental, operational, or other aspects of context. Using the context produced by the context classifier circuit 108, the processor 110 weighs sensor data obtained from the sensor array interface 106 when performing object detection processes.

Figure 2:
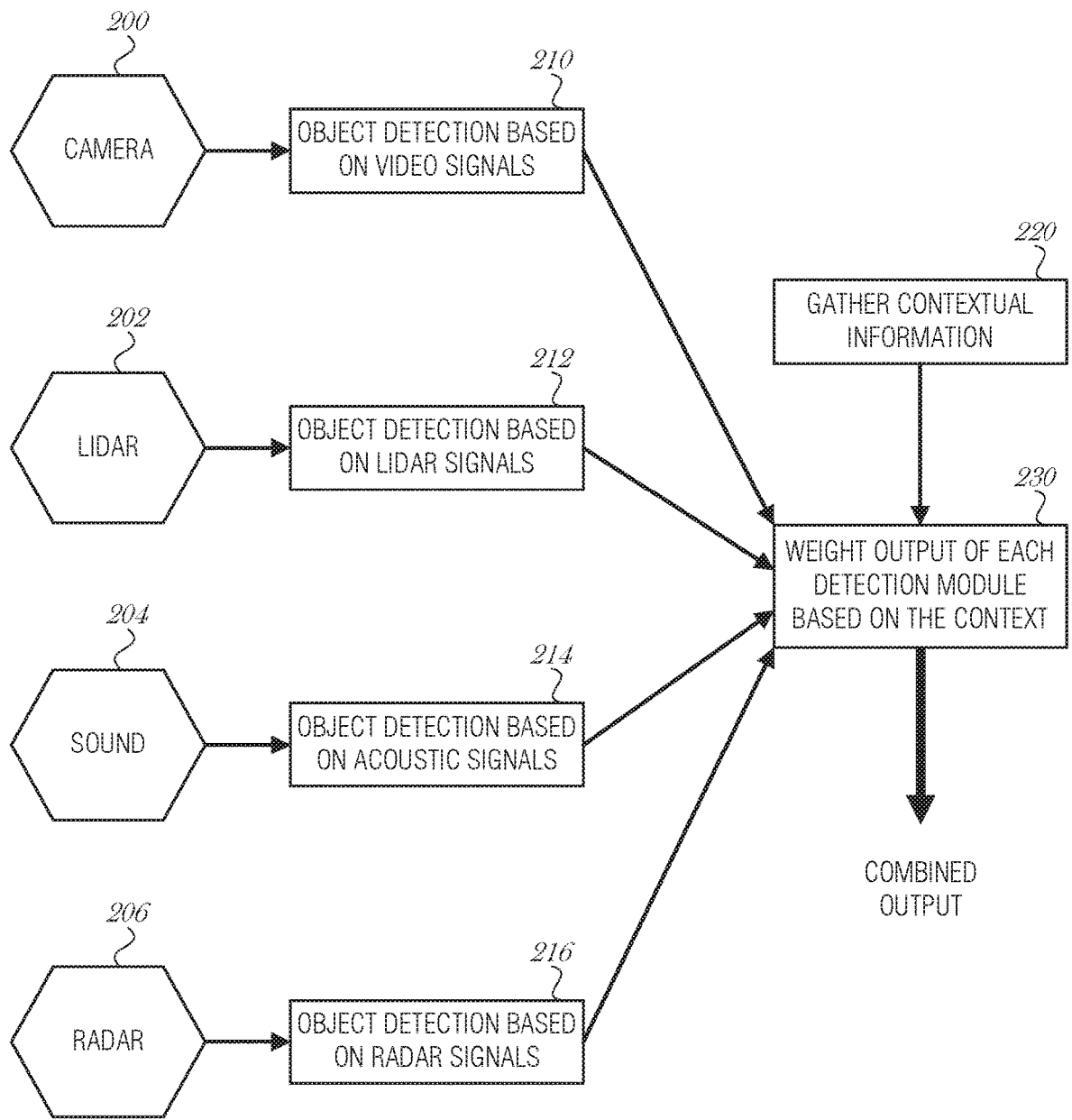
FIG. 2 is a diagram illustrating data and control flow for context-based digital signal processing for efficient object detection, according to an embodiment.

FIG. 2 is a diagram illustrating data and control flow for context-based digital signal processing for efficient object detection, according to an embodiment. A number of sensors may be used, including a camera 200, LiDAR 202, acoustic sensor 204, and radar 206. Object detection algorithms 210, 212, 214, and 216 are used for each respective sensor.

Contextual information is gathered and a context is output (operation 220). The contextual information may be gathered, at least in part, from the sensors 200, 202, 204, or 206. Additional contextual information may be obtained using vibration sensors, olfactory sensors, a GPS unit, an IMU, time of the day, weather sensors, etc. Context may also factor in sensor health and other operational conditions. Information regarding sensor health may be obtained based on the output of the routine health check software. Context may be determined using a rule-based system, machine learning, or the like.

Using a continuous learning system, the context-based digital signal processing may adapt to when sensors are not working properly and modify weights. Sensors that are overdue on maintenance, out of specification, uncalibrated, or otherwise malfunctioning, may have their corresponding detection algorithm weighted less, indicating less confidence in the result.

A relative weighting is applied to each of the object detection algorithm outputs (operation 230) based on the context identified by operation 220. A number of example contexts are provided here to describe various operating conditions and contexts. These are non-limiting and it is understood that any context may be derived and identified by the context processing operation 220.

Contextual information may indicate that the vehicle is in a tunnel, approaching a forest fire, viewing a scene that is partially in shadows, viewing a scene that is toward direct sunlight causing glare, or other situations. Each context or situation presents different challenges. For instance, when travelling through a tunnel, the lighting may be darker making visible light cameras less effective for object detection. Tunnels may also cause false readings for radar or acoustic sensors. With glare or direct sunlight, visible light cameras may be affected adversely due to images that have obscured or indecipherable edges. Smoke from a forest fire, smog, rain, or other fog may affect LiDAR. Additionally, each sensor type may have different effective operating ranges.

Typical ranges of cameras may be from 0 m to 500 m or so, and laser scanners (LiDAR) and radar from 0 m to 200 m or so. Cameras have a much higher range than LiDAR or radar, but LiDAR works better for near ranges. Hence, a relative weighting scheme provides higher weight to information generated from video signals at longer range or at greater distance and to LiDAR signals at close range or shorter distance.

FIG. 3 is a chart illustrating relative weights of sensors under varying contexts, according to an embodiment. As shown in FIG. 3, different sensors may be weighted differently based on the operating context of the vehicle. Referring to the chart in FIG. 3, a high "H" weight for a particular sensor may correspond to a value near or at the value of 1. In contrast, a lower weight, one that is not marked with an "H" in the chart, may have a value of 0 or 0.5, depending on the configuration. Weights may be applied using a linear combination. For instance, each sensor detection output may be weighted for a particular context. In the case where there are multiple contexts in a given operating scenario, each context may also be weighted. Weights may be configured by a user, a manufacturer, an administrator, or using automated methods.

In some systems, sensor weights are determined based on domain knowledge. In the improved systems described here, in an embodiment, sensor weight computation may be automated based on neural network methods. This results in automatically computing the perceptron weights for different contexts when trained with the sensor outputs (e.g., LiDAR, camera, radar, and acoustic) and the corresponding context information as the ground truth. The weights for the relevant sensors under specific context are assigned values between 0 to 1, when computed automatically by a machine learning framework. In an embodiment, the combined output is a linear combination of the output of the different object detection modules (e.g., object detection algorithms 210, 212, 214, and 216 of FIG. 2, which may be referred to as sensor detection output $S_1$, $S_2$, $S_3$, etc.) as shown in FIG. 2, as per their respective weights ($W_1$, $W_2$, $W_3$, etc.). For instance, the combined output may be derived from the following equation:

$$\text{Combined Output} = S_1 \times W_1 + S_2 \times W_2 + S_3 \times W_3 + \ldots + S_n \times W_n \quad \text{Equation 1}$$

In addition to environmental contexts, such as those illustrated in FIG. 3, contexts may also be defined using severity as a metric, where severity may be classified as "normal," "abnormal," and "hostile." Based on the severity of the operating context, sensor configuration parameters may be altered in addition to, or independent of, sensor weighting. Configuration parameters such as camera image resolution, camera image capture rate, LiDAR sampling rate (e.g., rotational speed), use of infrared cameras, or image compression or video optimization mechanisms may be used based on the context severity. The context severity may increase or decrease weights of certain detection outputs.

Normal context severity may refer to typical driving or operating conditions. Hostile context severity may refer to an emergency situation, such as when the vehicle is encountering a dangerous situation (e.g., collision avoidance), or is operating in a high-risk area (e.g., driving through a flooded area or forest fire). Abnormal context severity may refer to unusual driving conditions, such as when the vehicle is malfunctioning due to a mechanical failure.

Environmental context may include cabin sensors, such as sensors that are used to track or monitor vehicle occupants. Such sensors may include eye-tracking sensors, emotion recognition sensors, biometric sensors, or the like. Data from cabin sensors may be used to determine or influence context severity (e.g., if the driver appears to be afraid or have heighted awareness, then the context severity may be increased), or other environmental contexts (e.g., if the driver is intently staring at an event outside of the vehicle, the area corresponding to the driver's stare may be analyzed with more care for object recognition).

One or more sensors, detectors, detection algorithms, context evaluations, or the like may be operated in parallel. For instance, multiple field-programmable gate arrays (FPGAs) may be used for parallel processing. LiDAR, radar, and camera signals may be processed in parallel and the resulting information may be combined after weighting as per the context.

The mechanisms discussed here include a novel context sensitive and dynamic signal processing method for combining information from different sensors enabling an overall effective object detection framework for self-driving or autonomous vehicles.

Figure 4:
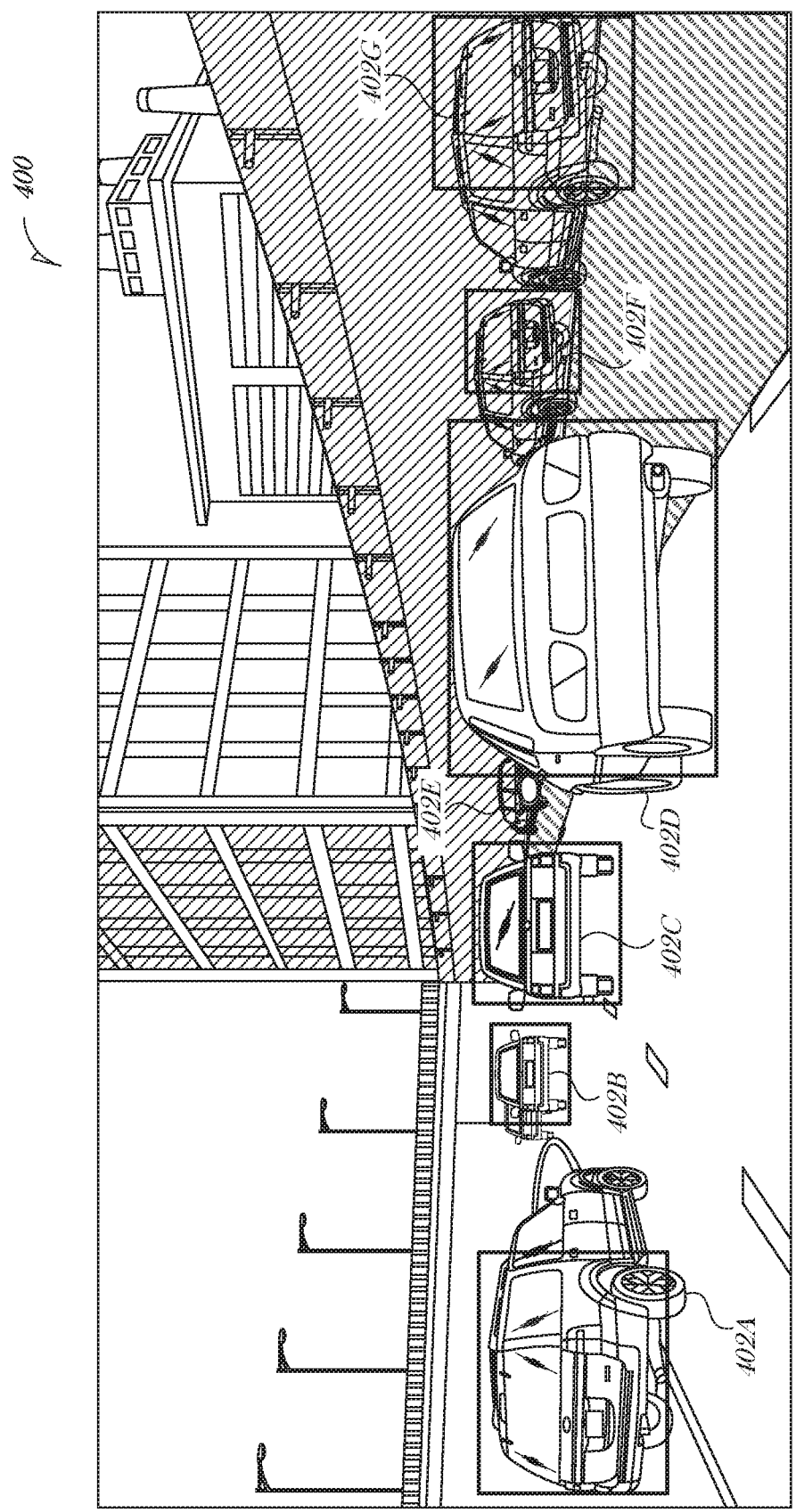
FIG. 4 is a diagram illustrating a field of view of sensors, according to an embodiment.

FIG. 4 is a diagram illustrating a field of view 400 of sensors, according to an embodiment. The field of view 400 includes a portion of a roadway that is partially illuminated by sunlight. The source of the sunlight is from the top-right portion of the field of view 400, resulting in shadows being cast on the objects in the right side of the field of view 400.

In the field of view 400, several objects are detected. Vehicles 402A, 402B, 402C, and 402D are detected on the left side of the field of view 400. These vehicles 402A, 402B, 402C, and 402D are fully illuminated by the daylight. Vehicles 402E, 402F, and 402G are partially or fully in the shadow of the wall.

The field of view 400 may include multiple contexts. The contexts may be a "day" context, a "shadow" context, "far range" context, and others. For the sake of discussion, only the "day" context and the "shadow" context will be used in this example.

Based on an initial evaluation of the field of view 400, the sensor system is able to determine that there are multiple contexts within the field of view 400. The field of view 400 is segmented, divided, or partitioned such that roughly the left side of the field of view 400 is assigned a day context. For this portion of the field of view 400 a visible light camera sensor may be preferred (e.g., given more weight) as the sensor that is most able to perform object detection in such a context.

Because of the shadows, a visible light camera sensor may have difficulties detecting the vehicles 402E, 402F, or 402G.

As such, the field of view 400 includes a second context, that of a "shadow" context, where shadows, glare, or other image artifacts exist that render image analysis more difficult. Other sensors that are also scanning the area may be assigned a higher weight than that given to the visible light camera to detect objects in the area that has the shadow context. For instance, according to the chart in FIG. 3, LiDAR and radar may be assigned higher weights when detecting vehicles 402E, 402F, or 402G.

Figure 5:
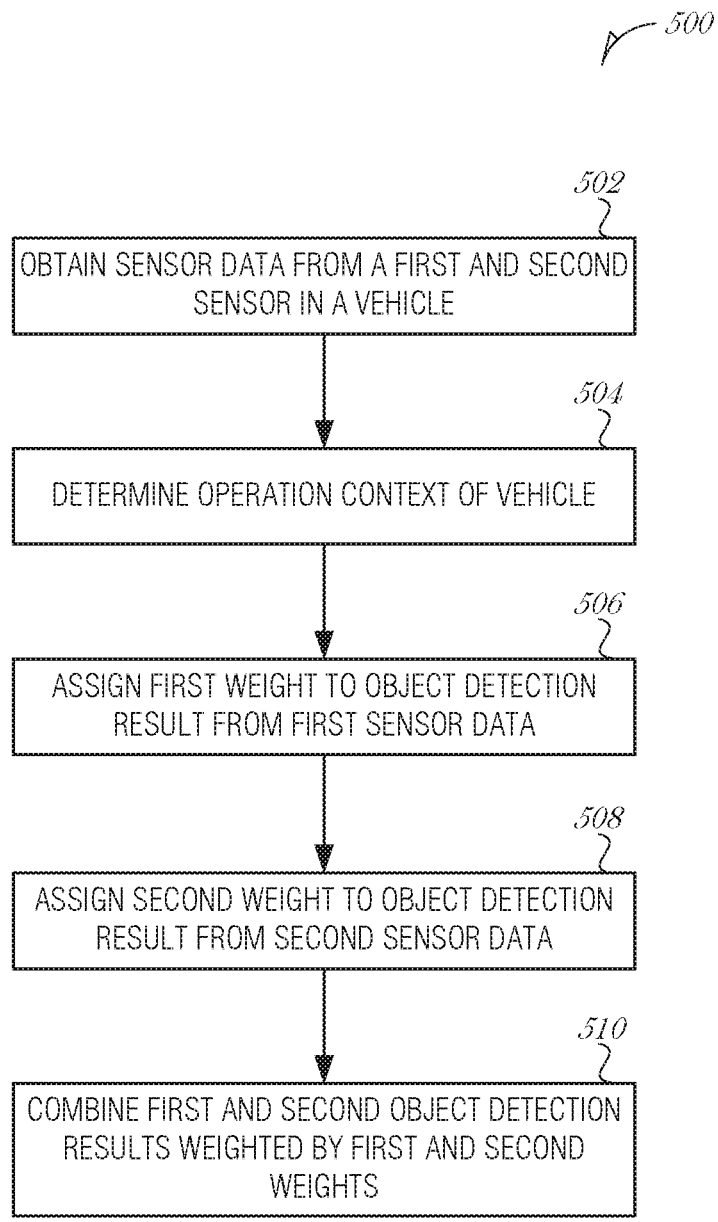
FIG. 5 is a flowchart illustrating a method for object detection, according to an embodiment.

FIG. 5 is a flowchart illustrating a method 500 for object detection, according to an embodiment. At 502, sensor data from a first sensor and a second sensor integrated in a vehicle is obtained. In an embodiment, the first sensor is a visible light camera. In a related embodiment, the first sensor is an acoustic sensor. In a related embodiment, the first sensor is a laser scanner. In a related embodiment, the first sensor is a radar. It is understood that the second sensor may be of similar or same types as that of the first sensor. Alternatively, the second sensor may be of a different type than the first sensor to provide sensor variety and diversity.

At 504, an operation context of the vehicle is determined. In an embodiment, determining the operation context of the vehicle comprises: accessing an image of an environment around the vehicle, determining an illumination amount in the image, and setting the operation context based on the illumination. For instance, the illumination may indicate whether the vehicle is operating in broad daylight, overcast, shadows, tunnels, rain shower, or the like.

In an embodiment, determining the operation context of the vehicle comprises: accessing sound data of an environment around the vehicle, determining whether the sound data indicates an emergency situation, and setting the operation context based on the whether the sound data indicates the emergency situation. For instance, sound data may be sensed by an acoustic sensor. A firetruck's siren, car alarm, local weather warning system, or other type of audible signal may be sensed by the acoustic sensor to indicate an emergency situation.

In an embodiment, determining the operation context of the vehicle comprises: accessing a current time and setting the operation context based on the current time. The time of day may be used to infer that the outdoor environment is generally dark (e.g., at night) or light (e.g., during the day).

In an embodiment, determining the operation context of the vehicle comprises: accessing an image of an environment around the vehicle, determining an average distance to objects in the image, and setting the operation context based on the average distance. Average distances of objects may be determined using various methods. Based on the average distance, some sensors are better equipped than others to perform object detection. As such, weights may be adjusted for sensor discrimination.

In an embodiment, determining the operation context of the vehicle comprises: accessing cabin sensor data of a cabin sensor, determining a condition of an occupant of the vehicle based on the cabin sensor data, and setting the operation context based on the condition of the occupant. Cabin sensors may include inward-facing cameras, seat position sensors, microphones, or the like. Cabin sensors are used to detect various physiological, biometric, emotional, or behavioral aspects of vehicle occupants.

In an embodiment, determining the operation context of the vehicle comprises: accessing a sensor health indicator and setting the operation context based on the sensor health indicator. Sensor health may be based on a mean time between failure (MTBF) rating, a number of uses, a time in deployment, or other factors. Sensor health may also be measured expressly by having the sensor obtain data and comparing the data to a truth value. Sensor health may be used to adjust a weight of any object detection algorithm that uses the sensor's data. A less reliable sensor will produce object detection with a skewed confidence value. Thus, in an embodiment, assigning the first weight to the first object detection result from sensor data of the first sensor comprises: adjusting the first weight to the first object detection result based on the sensor health indicator.

In an embodiment, determining the operation context of the vehicle comprises: accessing a context severity indicator and setting a context severity indicator based on the sensor health indicator. In a further embodiment, assigning the first weight to the first object detection result from sensor data of the first sensor comprises adjusting the first weight to the first object detection result based on the context severity indicator.

At 506, a first weight to a first object detection result from sensor data of the first sensor is assigned. The first weight may be adjusted based on the operating context. In an embodiment, assigning the first weight to the first object detection result from sensor data of the first sensor comprises implementing a machine-learning framework to automatically determine the first weight. In a further embodiment, the machine-learning framework comprises a neural network.

At 508, a second weight to a second object detection result from sensor data of the second sensor is assigned. The second weight may be adjusted based on the operating context. It is understood that the second weight may be determined based on factors similar or the same as those discussed with respect to the first weight. Assigning of the second weight is not discussed for brevity.

At 510, a combined object detection technique is performed by combining the first object detection result weighted by the first weight and the second object detection result weighted by the second weight. In an embodiment, performing the combined object detection technique by combining the first object detection result weighted by the first weight and the second object detection result weighted by the second weight comprises implementing a linear combination of the first object detection result weighted by the first weight and the second object detection result weighted by the second weight.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a fibrin readable by a machine (e.g., a computer). For example, a machine-readable storage, device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module, in an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
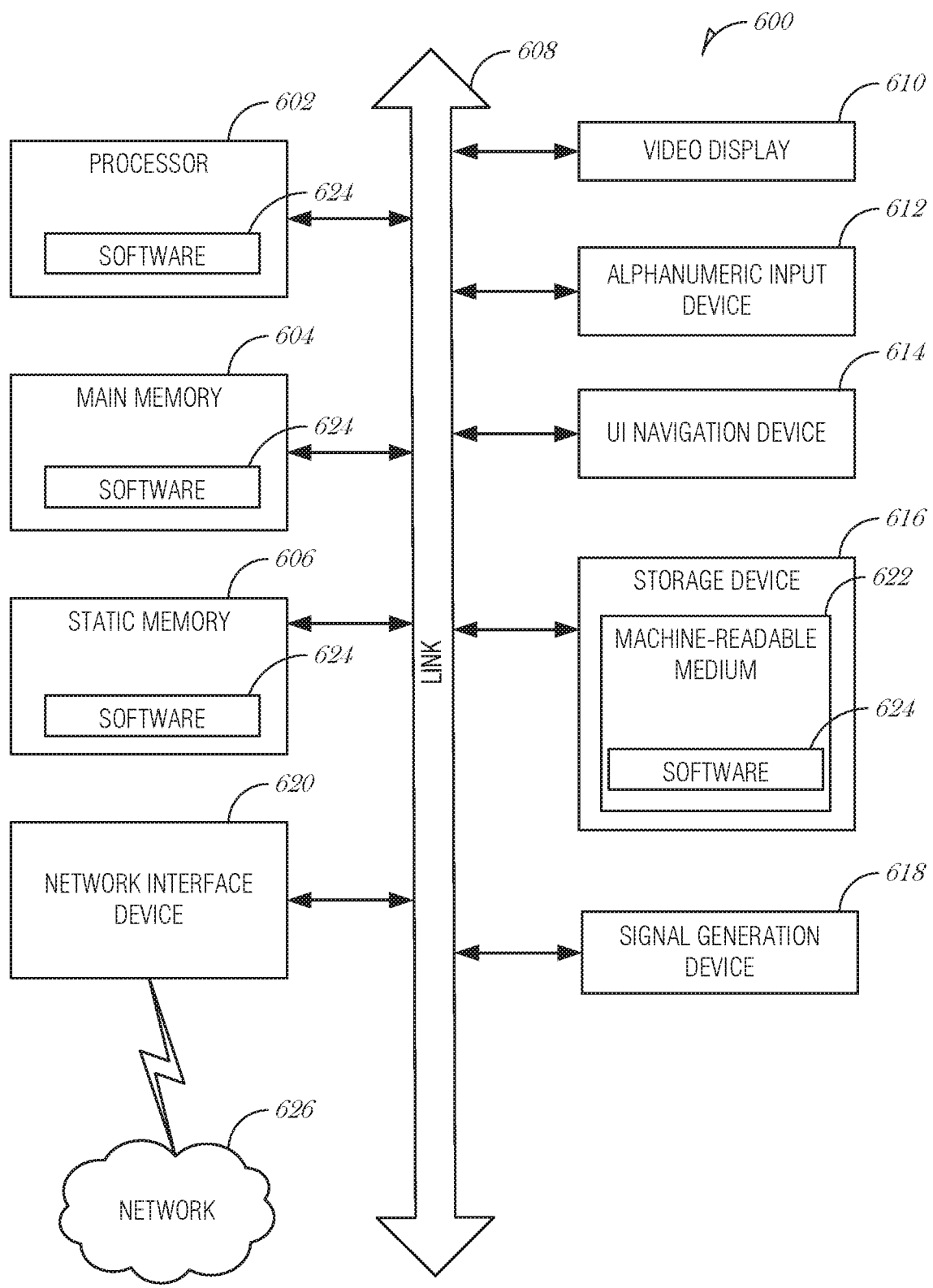
FIG. 6 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals other intangible medium to facilitate communication of such software.

ADDITIONAL NOTES & EXAMPLES

Example 1 is an object detection system, the system comprising: a processor to: access sensor data from a first sensor and a second sensor integrated in a vehicle; access an operating context of the vehicle; assign a first weight to a first object detection result from sensor data of the first sensor, the first weight adjusted based on the operating context; assign a second weight to a second object detection result from sensor data of the second sensor, the second weight adjusted based on the operating context; and perform a combined object detection technique by combining the first object detection result weighted by the first weight and the second object detection result weighted by the second weight.

In Example 2, the subject matter of Example 1 includes, a sensor array interface to obtain, when in operation, the sensor data from the first sensor and the second sensor.

In Example 3, the subject matter of Examples 1-2 includes, wherein the first sensor is a visible light camera.

In Example 4, the subject matter of Examples 1-3 includes, wherein the first sensor is an acoustic sensor.

In Example 5, the subject matter of Examples 1-4 includes, wherein the first sensor is a laser scanner.

In Example 6, the subject matter of Examples 1-5 includes, wherein the first sensor is a radar.

In Example 7, the subject matter of Examples 1-6 includes, a context classifier to determine the operating context of the vehicle.

In Example 8, the subject matter of Example 7 includes, wherein to determine the operating context of the vehicle, the context classifier is to: access an image of an environment around the vehicle; determine an illumination in the image; and set the operating context based on the illumination.

In Example 9, the subject matter of Examples 7-8 includes, wherein to determine the operating context of the vehicle, the context classifier is to: access sound data of an environment around the vehicle; determine whether the sound data indicates an emergency situation; and set the operating context based on the whether the sound data indicates the emergency situation.

In Example 10, the subject matter of Examples 7-9 includes, to determine the operating context of the vehicle, the context classifier is to: access a current time; and set the operating context based on the current time.

In Example 11, the subject matter of Examples 7-10 includes, wherein to determine the operating context of the vehicle, the context classifier is to: access an image of an environment around the vehicle; determine an average distance to objects in the image; and set the operating context based on the average distance.

In Example 12, the subject matter of Examples 7-11 includes, wherein to determine the operating context of the vehicle, the context classifier is to: access cabin sensor data of a cabin sensor; determine a condition of an occupant of the vehicle based on the cabin sensor data; and set the operating context based on the condition of the occupant.

In Example 13, the subject matter of Examples 7-12 includes, wherein to determine the operating context of the vehicle, the context classifier is to: access a sensor health indicator; and set the operating context based on the sensor health indicator.

In Example 14, the subject matter of Example 13 includes, wherein to assign the first weight to the first object detection result from sensor data of the first sensor, the processor is to: adjust the first weight to the first object detection result based on the sensor health indicator.

In Example 15, the subject matter of Examples 7-14 includes, wherein to determine the operating context of the vehicle, the context classifier is to: access a context severity indicator; and set a context severity indicator based on the sensor health indicator.

In Example 16, the subject matter of Example 15 includes, wherein to assign the first weight to the first object detection result from sensor data of the first sensor, the processor is to: adjust the first weight to the first object detection result based on the context severity indicator.

In Example 17, the subject matter of Examples 1-16 includes, wherein to assign the first weight to the first object detection result from sensor data of the first sensor, the processor is to: implement a machine-learning framework to automatically determine the first weight.

In Example 18, the subject matter of Example 17 includes, wherein the machine-learning framework comprises a neural network.

In Example 19, the subject matter of Examples 1-18 includes, wherein to perform the combined object detection technique by combining the first object detection result weighted by the first weight and the second object detection result weighted by the second weight, the processor is to: implement a linear combination of the first object detection result weighted by the first weight and the second object detection result weighted by the second weight.

Example 20 is a method for object detection, the method comprising: obtaining sensor data from a first sensor and a second sensor integrated in a vehicle; determining an operating context of the vehicle; assigning a first weight to a first object detection result from sensor data of the first sensor, the first weight adjusted based on the operating context; assigning a second weight to a second object detection result from sensor data of the second sensor, the second weight adjusted based on the operating context; and performing a combined object detection technique by combining the first object detection result weighted by the first weight and the second object detection result weighted by the second weight.

In Example 21, the subject matter of Example 20 includes, wherein the first sensor is a visible light camera.

In Example 22, the subject matter of Examples 20-21 includes, wherein the first sensor is an acoustic sensor.

In Example 23, the subject matter of Examples 20-22 includes, wherein the first sensor is a laser scanner.

In Example 24, the subject matter of Examples 20-23 includes, wherein the first sensor is a radar.

In Example 25, the subject matter of Examples 20-24 includes, wherein determining the operating context of the vehicle comprises: accessing an image of an environment around the vehicle; determining an illumination in the image; and setting the operating context based on the illumination.

In Example 26, the subject matter of Examples 20-25 includes, wherein determining the operating context of the vehicle comprises: accessing sound data of an environment around the vehicle; determining whether the sound data indicates an emergency situation; and setting the operating context based on the whether the sound data indicates the emergency situation.

In Example 27, the subject matter of Examples 20-26 includes, wherein determining the operating context of the vehicle comprises: accessing a current time; and setting the operating context based on the current time.

In Example 28, the subject matter of Examples 20-27 includes, wherein determining the operating context of the vehicle comprises: accessing an image of an environment around the vehicle; determining an average distance to objects in the image; and setting the operating context based on the average distance.

In Example 29, the subject matter of Examples 20-28 includes, wherein determining the operating context of the vehicle comprises: accessing cabin sensor data of a cabin sensor; determining a condition of an occupant of the vehicle based on the cabin sensor data; and setting the operating context based on the condition of the occupant.

In Example 30, the subject matter of Examples 20-29 includes, wherein determining the operating context of the vehicle comprises: accessing a sensor health indicator; and setting the operating context based on the sensor health indicator.

In Example 31, the subject matter of Example 30 includes, wherein assigning the first weight to the first object detection result from sensor data of the first sensor comprises: adjusting the first weight to the first object detection result based on the sensor health indicator.

In Example 32, the subject matter of Examples 20-31 includes, wherein determining the operating context of the vehicle comprises: accessing a context severity indicator; and setting a context severity indicator based on the sensor health indicator.

In Example 33, the subject matter of Example 32 includes, wherein assigning the first weight to the first object detection result from sensor data of the first sensor comprises: adjusting the first weight to the first object detection result based on the context severity indicator.

In Example 34, the subject matter of Examples 20-33 includes, wherein assigning the first weight to the first object detection result from sensor data of the first sensor comprises: implementing a machine-learning framework to automatically determine the first weight.

In Example 35, the subject matter of Example 34 includes, wherein the machine-learning framework comprises a neural network.

In Example 36, the subject matter of Examples 20-35 includes, wherein performing the combined object detection technique by combining the first object detection result weighted by the first weight and the second object detection result weighted by the second weight comprises: implementing a linear combination of the first object detection result weighted by the first weight and the second object detection result weighted by the second weight.

Example 37 is at least one machine-readable medium including instructions, which when executed by a machine, cause the machine to perform operations of any of the methods of Examples 20-36.

Example 38 is an apparatus comprising means for performing any of the methods of Examples 20-36.

Example 39 is an apparatus for object detection, the apparatus comprising: means for obtaining sensor data from a first sensor and a second sensor integrated in a vehicle; means for determining an operating context of the vehicle; means for assigning a first weight to a first object detection result from sensor data of the first sensor, the first weight adjusted based on the operating context; means for assigning a second weight to a second object detection result from sensor data of the second sensor, the second weight adjusted based on the operating context; and means for performing a combined object detection technique by combining the first object detection result weighted by the first weight and the second object detection result weighted by the second weight.

In Example 40, the subject matter of Example 39 includes, wherein the first sensor is a visible light camera.

In Example 41, the subject matter of Examples 39-40 includes, wherein the first sensor is an acoustic sensor.

In Example 42, the subject matter of Examples 39-41 includes, wherein the first sensor is a laser scanner.

In Example 43, the subject matter of Examples 39-42 includes, wherein the first sensor is a radar.

In Example 44, the subject matter of Examples 39-43 includes, wherein the means for determining the operating context of the vehicle comprise: means for accessing an image of an environment around the vehicle; means for determining an illumination in the image; and means for setting the operating context based on the illumination.

In Example 45, the subject matter of Examples 39-44 includes, wherein the means for determining the operating context of the vehicle comprise: means for accessing sound data of an environment around the vehicle; means for determining whether the sound data indicates an emergency situation; and means for setting the operating context based on the whether the sound data indicates the emergency situation.

In Example 46, the subject matter of Examples 39-45 includes, wherein the means for determining the operating context of the vehicle comprise: means for accessing a current time; and means for setting the operating context based on the current time.

In Example 47, the subject matter of Examples 39-46 includes, wherein the means for determining the operating context of the vehicle comprise: means for accessing an image of an environment around the vehicle; means for determining an average distance to objects in the image; and means for setting the operating context based on the average distance.

In Example 48, the subject matter of Examples 39-47 includes, wherein the means for determining the operating context of the vehicle comprise: means for accessing cabin sensor data of a cabin sensor; means for determining a condition of an occupant of the vehicle based on the cabin sensor data; and means for setting the operating context based on the condition of the occupant.

In Example 49, the subject matter of Examples 39-48 includes, wherein the means for determining the operating context of the vehicle comprise: means for accessing a sensor health indicator; and means for setting the operating context based on the sensor health indicator.

In Example 50, the subject matter of Example 49 includes, wherein the means for assigning the first weight to the first object detection result from sensor data of the first sensor comprise: means for adjusting the first weight to the first object detection result based on the sensor health indicator.

In Example 51, the subject matter of Examples 39-50 includes, wherein the means for determining the operating context of the vehicle comprise: means for accessing a context severity indicator; and means for setting a context severity indicator based on the sensor health indicator.

In Example 52, the subject matter of Example 51 includes, wherein the means for assigning the first weight to the first object detection result from sensor data of the first sensor comprise: means for adjusting the first weight to the first object detection result based on the context severity indicator.

In Example 53, the subject matter of Examples 39-52 includes, wherein the means for assigning the first weight to the first object detection result from sensor data of the first sensor comprise: means for implementing a machine-learning framework to automatically determine the first weight.

In Example 54, the subject matter of Example 53 includes, wherein the machine-learning framework comprises a neural network.

In Example 55, the subject matter of Examples 39-54 includes, wherein the means for performing the combined object detection technique by combining the first object detection result weighted by the first weight and the second object detection result weighted by the second weight comprise: means for implementing a linear combination of the first object detection result weighted by the first weight and the second object detection result weighted by the second weight.

Example 56 is at least one machine-readable medium including instructions for object detection, the instructions when executed by a machine, cause the machine to perform operations comprising: obtaining sensor data from a first sensor and a second sensor integrated in a vehicle; determining an operating context of the vehicle; assigning a first weight to a first object detection result from sensor data of the first sensor, the first weight adjusted based on the operating context; assigning a second weight to a second object detection result from sensor data of the second sensor, the second weight adjusted based on the operating context; and performing a combined object detection technique by combining the first object detection result weighted by the first weight and the second object detection result weighted by the second weight.

In Example 57, the subject matter of Example 56 includes, wherein the first sensor is a visible light camera.

In Example 58, the subject matter of Examples 56-57 includes, wherein the first sensor is an acoustic sensor.

In Example 59, the subject matter of Examples 56-58 includes, wherein the first sensor is a laser scanner.

In Example 60, the subject matter of Examples 56-59 includes, wherein the first sensor is a radar.

In Example 61, the subject matter of Examples 56-60 includes, wherein determining the operating context of the vehicle comprises: accessing an image of an environment around the vehicle; determining an illumination in the image; and setting the operating context based on the illumination.

In Example 62, the subject matter of Examples 56-61 includes, wherein determining the operating context of the vehicle comprises: accessing sound data of an environment around the vehicle; determining whether the sound data indicates an emergency situation; and setting the operating context based on the whether the sound data indicates the emergency situation.

In Example 63, the subject matter of Examples 56-62 includes, wherein determining the operating context of the vehicle comprises: accessing a current time; and setting the operating context based on the current time.

In Example 64, the subject matter of Examples 56-63 includes, wherein determining the operating context of the vehicle comprises: accessing an image of an environment around the vehicle; determining an average distance to objects in the image; and setting the operating context based on the average distance.

In Example 65, the subject matter of Examples 56-64 includes, wherein determining the operating context of the vehicle comprises: accessing cabin sensor data of a cabin sensor; determining a condition of an occupant of the vehicle based on the cabin sensor data; and setting the operating context based on the condition of the occupant.

In Example 66, the subject matter of Examples 56-65 includes, wherein determining the operating context of the vehicle comprises: accessing a sensor health indicator; and setting the operating context based on the sensor health indicator.

In Example 67, the subject matter of Example 66 includes, wherein assigning the first weight to the first object detection result from sensor data of the first sensor comprises: adjusting the first weight to the first object detection result based on the sensor health indicator.

In Example 68, the subject matter of Examples 56-67 includes, wherein determining the operating context of the vehicle comprises: accessing a context severity indicator; and setting a context severity indicator based on the sensor health indicator.

In Example 69, the subject matter of Example 68 includes, wherein assigning the first weight to the first object detection result from sensor data of the first sensor comprises: adjusting the first weight to the first object detection result based on the context severity indicator.

In Example 70, the subject matter of Examples 56-69 includes, wherein assigning the first weight to the first object detection result from sensor data of the first sensor comprises: implementing a machine-learning framework to automatically determine the first weight.

In Example 71, the subject matter of Example 70 includes, wherein the machine-learning framework comprises a neural network.

In Example 72, the subject matter of Examples 56-71 includes, wherein performing the combined object detection technique by combining the first object detection result weighted by the first weight and the second object detection result weighted by the second weight comprises: implementing a linear combination of the first object detection result weighted by the first weight and the second object detection result weighted by the second weight.

Example 73 is at least one machine-readable medium including instructions that, when executed by a processor subsystem, cause the processor subsystem to perform operations to implement of any of Examples 1-72.

Example 74 is an apparatus comprising means to implement of any of Examples 1-72.

Example 75 is a system to implement of any of Examples 1-72.

Example 76 is a method to implement of any of Examples 1-72.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An object detection system, the system comprising:
a processor to:
    access sensor data from a first sensor and a second sensor integrated in a vehicle;
    access an operating context of the vehicle;
    assign a first weight to a first object detection result from sensor data of the first sensor, the first weight adjusted based on the operating context;
    assign a second weight to a second object detection result from sensor data of the second sensor, the second weight adjusted based on the operating context; and
    perform a combined object detection technique by combining the first object detection result weighted by the first weight and the second object detection result weighted by the second weight,
    wherein to assign the first weight to the first object detection result from sensor data of the first sensor, the processor is to implement a neural network to automatically determine the first weight, the neural network trained on different contexts and corresponding sensor outputs.

2. The system of claim 1, further comprising:
a sensor array interface to obtain, when in operation, the sensor data from the first sensor and the second sensor.

3. The system of claim 1, wherein the first sensor is a visible light camera.

4. The system of claim 1, wherein the first sensor is an acoustic sensor.

5. The system of claim 1, wherein the first sensor is a laser scanner.

6. The system of claim 1, wherein the first sensor is a radar.

7. The system of claim 1, further comprising:
a context classifier to determine the operating context of the vehicle.

8. The system of claim 7, wherein to determine the operating context of the vehicle, the context classifier is to:
    access an image of an environment around the vehicle;
    determine an illumination in the image; and
    set the operating context based on the illumination.

9. The system of claim 7, wherein to determine the operating context of the vehicle, the context classifier is to:
    access sound data of an environment around the vehicle;
    determine whether the sound data indicates an emergency situation; and
    set the operating context based on the whether the sound data indicates the emergency situation.

10. The system of claim 7, to determine the operating context of the vehicle, the context classifier is to:
    access a current time; and
    set the operating context based on the current time.

11. The system of claim 7, wherein to determine the operating context of the vehicle, the context classifier is to:
    access an image of an environment around the vehicle;
    determine an average distance to objects in the image; and
    set the operating context based on the average distance.

12. The system of claim 7, wherein to determine the operating context of the vehicle, the context classifier is to:
    access cabin sensor data of a cabin sensor;
    determine a condition of an occupant of the vehicle based on the cabin sensor data; and
    set the operating context based on the condition of the occupant.

13. The system of claim 7, wherein to determine the operating context of the vehicle, the context classifier is to:

access a sensor health indicator; and
set the operating context based on the sensor health indicator.

14. The system of claim 13, wherein to assign the first weight to the first object detection result from sensor data of the first sensor, the processor is to:
adjust the first weight to the first object detection result based on the sensor health indicator.

15. The system of claim 7, wherein to determine the operating context of the vehicle, the context classifier is to:
access a context severity indicator; and
set a context severity indicator based on the sensor health indicator.

16. The system of claim 15, wherein to assign the first weight to the first object detection result from sensor data of the first sensor, the processor is to:
adjust the first weight to the first object detection result based on the context severity indicator.

17. The system of claim 1, wherein to perform the combined object detection technique by combining the first object detection result weighted by the first weight and the second object detection result weighted by the second weight, the processor is to:
implement a linear combination of the first object detection result weighted by the first weight and the second object detection result weighted by the second weight.

18. A method for object detection, the method comprising:
obtaining sensor data from a first sensor and a second sensor integrated in a vehicle;
determining an operating context of the vehicle;
assigning a first weight to a first object detection result from sensor data of the first sensor, the first weight adjusted based on the operating context;
assigning a second weight to a second object detection result from sensor data of the second sensor; the second weight adjusted based on the operating context; and
performing a combined object detection technique by combining the first object detection result weighted by the first weight and the second object detection result weighted by the second weight,
wherein assigning the first weight to the first object detection result from sensor data of the first sensor comprises implementing a neural network to automatically determine the first weight, the neural network trained on different contexts and corresponding sensor outputs.

19. The method of claim 18, wherein determining the operating context of the vehicle comprises:
accessing an image of an environment around the vehicle;
determining an illumination in the image; and
setting the operating context based on the illumination.

20. The method of claim 18, wherein determining the operating context of the vehicle comprises:
accessing an image of an environment around the vehicle;
determining an average distance to objects in the image; and
setting the operating context based on the average distance.

21. The method of claim 18, wherein determining the operating context of the vehicle comprises:
accessing cabin sensor data of a cabin sensor;
determining a condition of an occupant of the vehicle based on the cabin sensor data; and
setting the operating context based on the condition of the occupant.

22. At least one non-transitory machine-readable medium including instructions for object detection, the instructions when executed by a machine, cause the machine to perform operations comprising:
obtaining sensor data from a first sensor and a second sensor integrated in a vehicle;
determining an operating context of the vehicle;
assigning a first weight to a first object detection result from sensor data of the first sensor, the first weight adjusted based on the operating context;
assigning a second weight to a second object detection result from sensor data of the second sensor, the second weight adjusted based on the operating context; and
performing a combined object detection technique by combining the first object detection result weighted by the first weight and the second object detection result weighted by the second weight,
wherein assigning the first weight to the first object detection result from sensor data of the first sensor comprises implementing a neural network to automatically determine the first weight, the neural network trained on different contexts and corresponding sensor outputs.

23. The non-transitory machine-readable medium of claim 22, wherein performing the combined object detection technique by combining the first object detection result weighted by the first weight and the second object detection result weighted by the second weight comprises:
implementing a linear combination of the first object detection result weighted by the first weight and the second object detection result weighted by the second weight.

* * * * *

UNITED STATES PATENT AND TRADEMARK OFFICE
CERTIFICATE OF CORRECTION

PATENT NO. : 10,558,897 B2
APPLICATION NO. : 15/855763
DATED : February 11, 2020
INVENTOR(S) : Sharma et al.

Page 1 of 1

It is certified that error appears in the above-identified patent and that said Letters Patent is hereby corrected as shown below:

In the Claims

In Column 19, Line 35, in Claim 18, delete "sensor;" and insert --sensor,-- therefor Signed and Sealed this
Thirtieth Day of November, 2021

Drew Hirshfeld
*Performing the Functions and Duties of the
Under Secretary of Commerce for Intellectual Property and
Director of the United States Patent and Trademark Office*